United States Patent
Mitsufuji et al.

(10) Patent No.: US 9,331,545 B2
(45) Date of Patent: May 3, 2016

(54) ROTATION APPARATUS INCLUDING MOTOR AND SPEED REDUCER

(71) Applicant: SUMITOMO HEAVY INDUSTRIES, LTD., Tokyo (JP)

(72) Inventors: Sakae Mitsufuji, Obu (JP); Shinichi Nishibe, Obu (JP); Yuichi Nishitani, Obu (JP); Tetsuzo Ishikawa, Obu (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 75 days.

(21) Appl. No.: 14/205,432

(22) Filed: Mar. 12, 2014

(65) Prior Publication Data

US 2014/0296014 A1    Oct. 2, 2014

(30) Foreign Application Priority Data

Mar. 29, 2013    (JP) ................................ 2013-071780

(51) Int. Cl.
| | |
|---|---|
| *F16H 1/32* | (2006.01) |
| *H02K 7/116* | (2006.01) |
| *F16H 57/025* | (2012.01) |
| *F16H 57/02* | (2012.01) |

(52) U.S. Cl.
CPC ................. *H02K 7/116* (2013.01); *F16H 1/32* (2013.01); *F16H 57/025* (2013.01); *F16H 2001/325* (2013.01); *F16H 2057/02073* (2013.01)

(58) Field of Classification Search
CPC ................................................ F16H 2001/325
USPC ........................................................ 475/178
See application file for complete search history.

(56) References Cited

U.S. PATENT DOCUMENTS

| | | | | |
|---|---|---|---|---|
| 5,290,208 | A * | 3/1994 | Minegishi ...................... | 475/178 |
| 7,942,779 | B2 * | 5/2011 | Kobayashi ..................... | 475/177 |
| 2004/0220008 | A1 * | 11/2004 | Mingishi et al. ............... | 475/163 |
| 2010/0004087 | A1 | 1/2010 | Minegishi et al. | |

FOREIGN PATENT DOCUMENTS

| | | | | |
|---|---|---|---|---|
| DE | 102013001161 A1 * | 8/2013 | ................ | F16H 1/32 |
| EP | 2 180 210 A1 | 4/2010 | | |

(Continued)

OTHER PUBLICATIONS

European Search Report application No. 14161092.3 dated Sep. 19, 2014.

*Primary Examiner* — Robert Hodge
*Assistant Examiner* — Ryan Dodd
(74) *Attorney, Agent, or Firm* — Squire Patton Boggs (US) LLP

(57) ABSTRACT

In a rotation apparatus including a motor and a speed reducer, the speed reducer includes a casing, an internal gear integrated with the casing, a planetary gear internally engaged with the internal gear, and a carrier body arranged in an axial side portion of the planetary gear, the motor and the speed reducer are connected with each other via an adapter, the adapter includes a motor-fixed surface fixed to the motor, a carrier-fixed surface fixed to the carrier body, and an externally fixed surface that is not parallel with the carrier-fixed surface and is fixed to an external member, a driven member is connected to the casing, the driven member, the speed reducer, and the externally fixed surface are overlapped with each other when viewed from a radial direction, and the driven member is rotated within a range of 180 degrees.

6 Claims, 4 Drawing Sheets

(56) References Cited

FOREIGN PATENT DOCUMENTS

| EP | 2 354 594 A1 | 8/2011 |
| JP | 2000-329200 A | 11/2000 |
| JP | 2005-233310 A | 9/2005 |

* cited by examiner

10 ROTATION APPARATUS
11 MOTOR
12 SPEED REDUCER
20 EXTERNAL GEAR (PLANETARY GEAR)
22 INTERNAL GEAR
24 CASING
34 FIRST CARRIER BODY
50 ADAPTER
51 MOTOR-FIXED SURFACE
52 CARRIER-FIXED SURFACE
53 EXTERNALLY FIXED SURFACE
62 INSTALLATION FLOOR (EXTERNAL MEMBER)
68 MATERIAL TRAY (DRIVEN MEMBER)

US 9,331,545 B2

ROTATION APPARATUS INCLUDING MOTOR AND SPEED REDUCER

INCORPORATION BY REFERENCE

Priority is claimed to Japanese Patent Application No. 2013-071780, filed Mar. 29, 2013, the entire content of each of which is incorporated herein by reference.

BACKGROUND

1. Technical Field

The present invention relates to a rotation apparatus including a motor and a speed reducer.

2. Description of the Related Art

The related art discloses a driving apparatus that includes a motor and a speed reducer.

The speed reducer has a casing, an internal gear that is integrated with the casing, a planetary gear that is internally engaged with the internal gear, and a carrier body that is arranged in an axial side portion of the planetary gear.

The carrier body is integrated with an output shaft, and the output shaft projects from an axially endmost section (that is, an axially endmost section of the driving apparatus) of the speed reducer in a cantilever state.

SUMMARY

According to an embodiment of the present invention, there is provided a rotation apparatus including a motor and a speed reducer, in which the speed reducer includes a casing, an internal gear that is integrated with the casing, a planetary gear that is internally engaged with the internal gear, and a carrier body that is arranged in an axial side portion of the planetary gear, the motor and the speed reducer are connected with each other via an adapter, the adapter has a motor-fixed surface that is fixed to the motor, a carrier-fixed surface that is fixed to the carrier body, and an externally fixed surface that is not parallel with the carrier-fixed surface and is fixed to an external member, a driven member is connected to the casing, the driven member, the speed reducer, and the externally fixed surface are overlapped with each other when viewed from a radial direction of the speed reducer, and the driven member is rotated within a range of 180 degrees.

DETAILED DESCRIPTION

In such a driving apparatus, a driven member is connected to the output shaft that projects from the axially endmost section of the driving apparatus, and thus the entire apparatus may be long in an axial direction.

It is desirable to provide a rotation apparatus that is capable of suppressing an increase in axial length.

According to the embodiment of the present invention, the motor and the speed reducer are connected with each other via the adapter, and the adapter is fixed to the carrier body of the speed reducer while being fixed to the external member. Output of the speed reducer is removed from the casing and the driven member is connected to the casing.

The present invention relates to the rotation apparatus, and the driven member is rotated only within the range of 180 degrees. Accordingly, the driven member, the speed reducer, and the externally fixed surface of the adapter can be configured to be overlapped with each other when viewed from a radial direction of the speed reducer, and the axial length of the entire rotation apparatus can be suppressed.

Hereinafter, an exemplary embodiment of the present invention will be described in detail with reference to the accompanying drawings.

Figure 1:
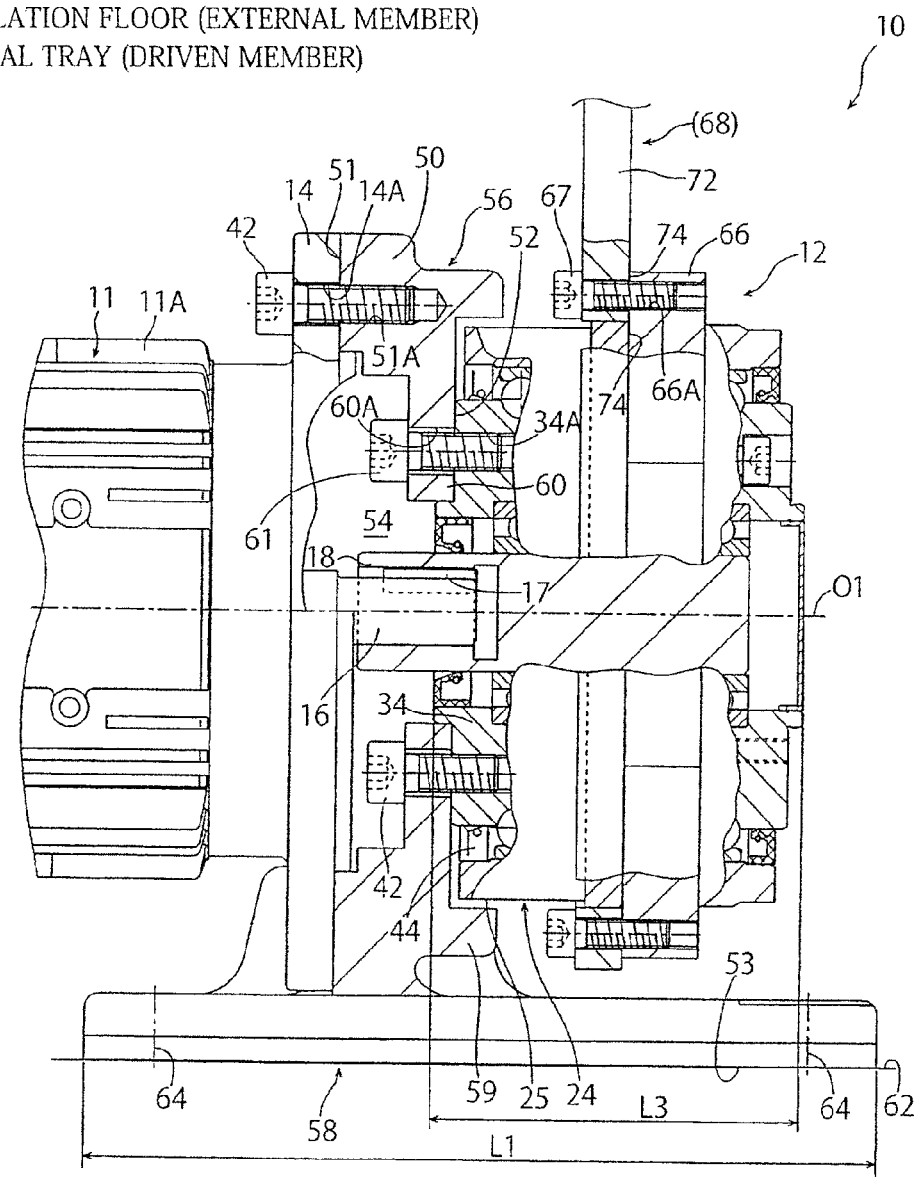
FIG. 1 is a cross-sectional view showing a main part of a rotation apparatus including a motor and a speed reducer according to an exemplary embodiment of the present invention.
Figure 2:
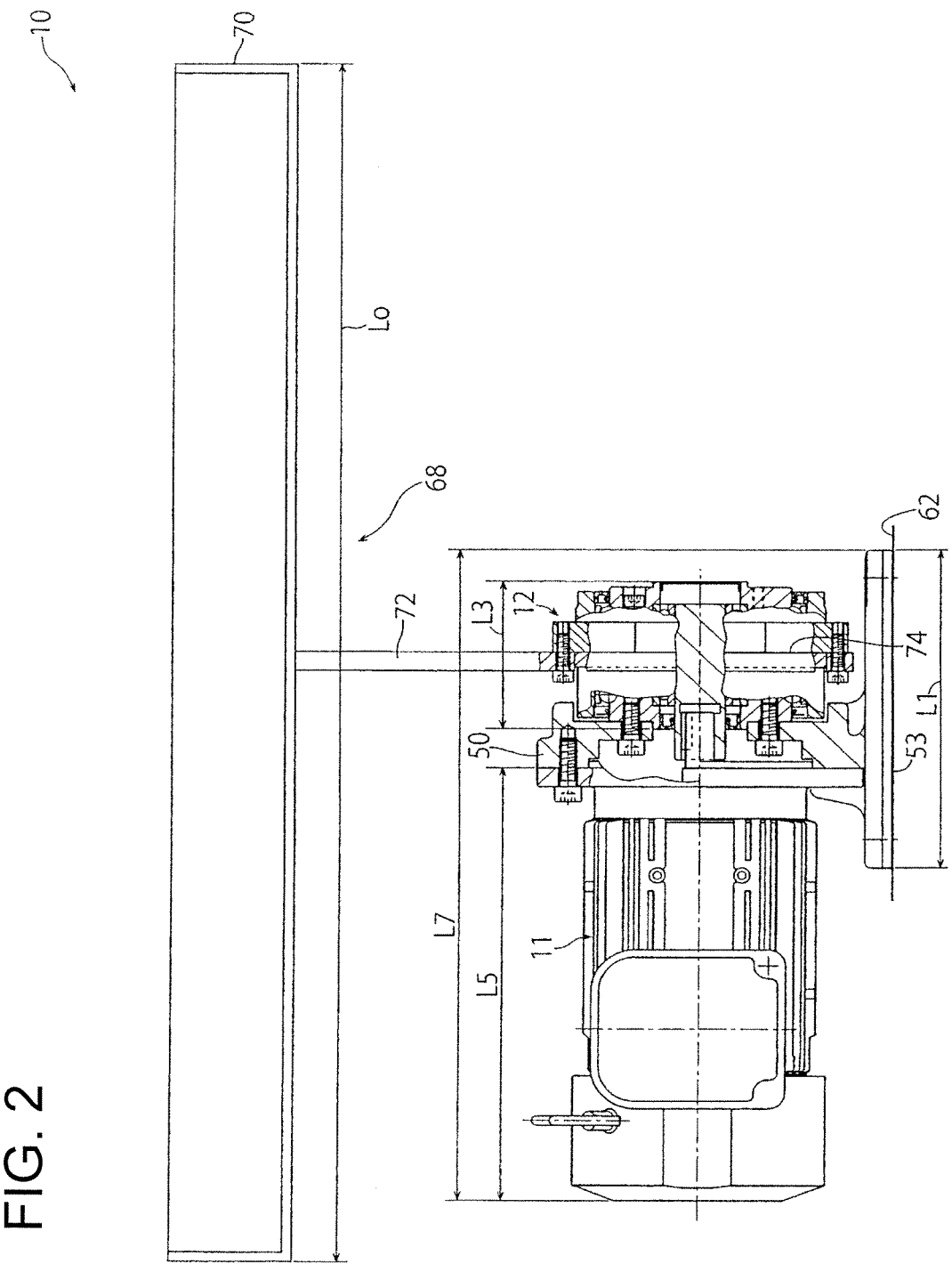
FIG. 2 is a front view with a partial cross-section showing the entirety of the rotation apparatus of FIG. 1.

FIG. 1 is a cross-sectional view showing a main part of a rotation apparatus including a motor and a speed reducer according to the exemplary embodiment of the present invention, and FIG. 2 is a front view with a partial cross-section showing the entirety of the rotation apparatus of FIG. 1.

The rotation apparatus 10 rotates a material tray that receives materials such as powder-like materials and granular materials from a preceding process in a factory or the like and transfers the materials to a container or the like of a following process in a certain range, and includes a motor 11 and a speed reducer 12.

A motor shaft 16 of the motor 11 is connected with an input shaft 18 of the speed reducer 12 via a key 17. For convenience, a configuration of the speed reducer 12 will be described first.

Figure 4:
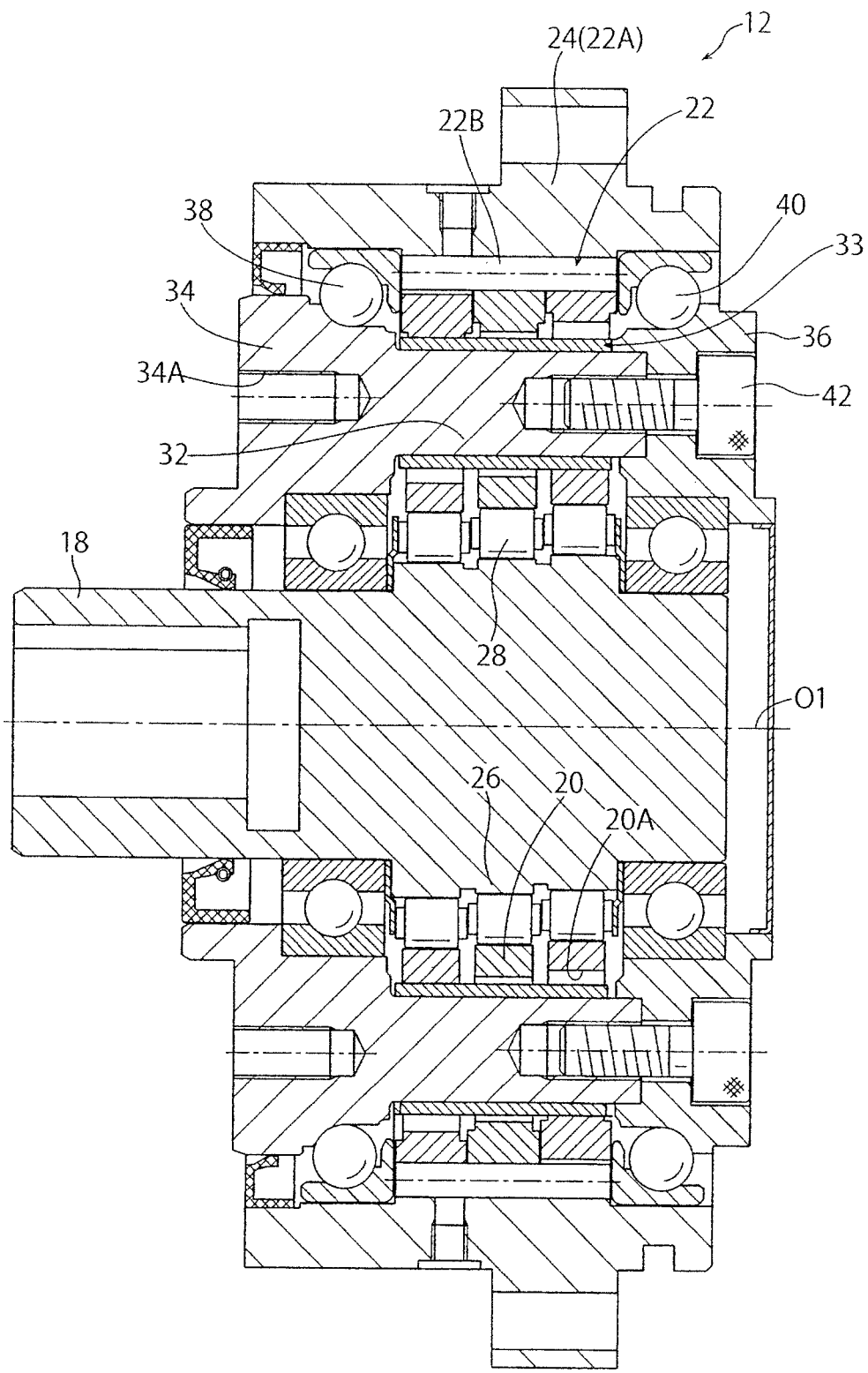
FIG. 4 is a cross-sectional view showing a configuration of the speed reducer of the rotation apparatus of FIG. 1.

In this embodiment, a so-called eccentric oscillation type speed reducer as shown in FIG. 4 is adopted as the speed reducer 12. The speed reducer 12 has a casing 24, an internal gear 22 that is integrated with the casing 24, external gears (planetary gears) 20 that are internally engaged with the internal gear 22, and first and second carrier bodies 34 and 36 that are arranged in both axial side portions of the external gear 20.

Hereinafter, the configuration of the speed reducer 12 will be described in detail. The input shaft 18 of the speed reducer 12 is arranged coaxially with a shaft center O1 of the internal gear 22. Three eccentric bodies 26 are integrally formed in the input shaft 18. In other words, the input shaft 18 functions as an eccentric body shaft that has the eccentric bodies 26. The three external gears 20 are respectively incorporated on outer circumferences of the eccentric bodies 26 via rollers 28. The three external gears 20 have an eccentric phase difference of 120 degrees. Each of the external gears 20 is internally engaged with the internal gear 22.

The internal gear 22 is integrated with the casing 24. Specifically, in this embodiment, the internal gear 22 is configured to have an internal gear main body 22A that is integrated with the casing 24, and a cylindrical outer pin 22B that is rotatably incorporated into the internal gear main body 22A to constitute internal teeth of the internal gear 22. A configuration of the casing 24 will be described later. The number of teeth of the external gear 20 is slightly smaller than the number of teeth of the internal gear 22 (slight difference in the number of the teeth). In this example, the difference in the number of the teeth is set to one.

A through-hole 20A is formed in each of the external gears 20, and a pin-shaped member 32 and an inner roller 33 as a sliding promotion member penetrate each of the through-holes 20A. As described above, a pair of the first and second carrier bodies 34 and 36 are arranged in both of the axial side portions of the external gear 20. Of the first and second carrier bodies and 36, the first carrier body 34 on a motor 11 side corresponds to a carrier body according to certain embodiments of the present invention. The first and second carrier bodies 34 and 36 are rotatably supported by the casing 24 via bearings 38 and 40.

The pin-shaped member 32 is integrated with the first carrier body 34, and the first and second carrier bodies 34 and 36 are connected with each other via the pin-shaped member 32 and a bolt 42. An adapter tap hole 34A is formed in the first carrier body 34, and an adapter 50 is connected thereto via the bolt 42 (FIG. 1).

Sign 44 is an oil seal.

Figure 3:
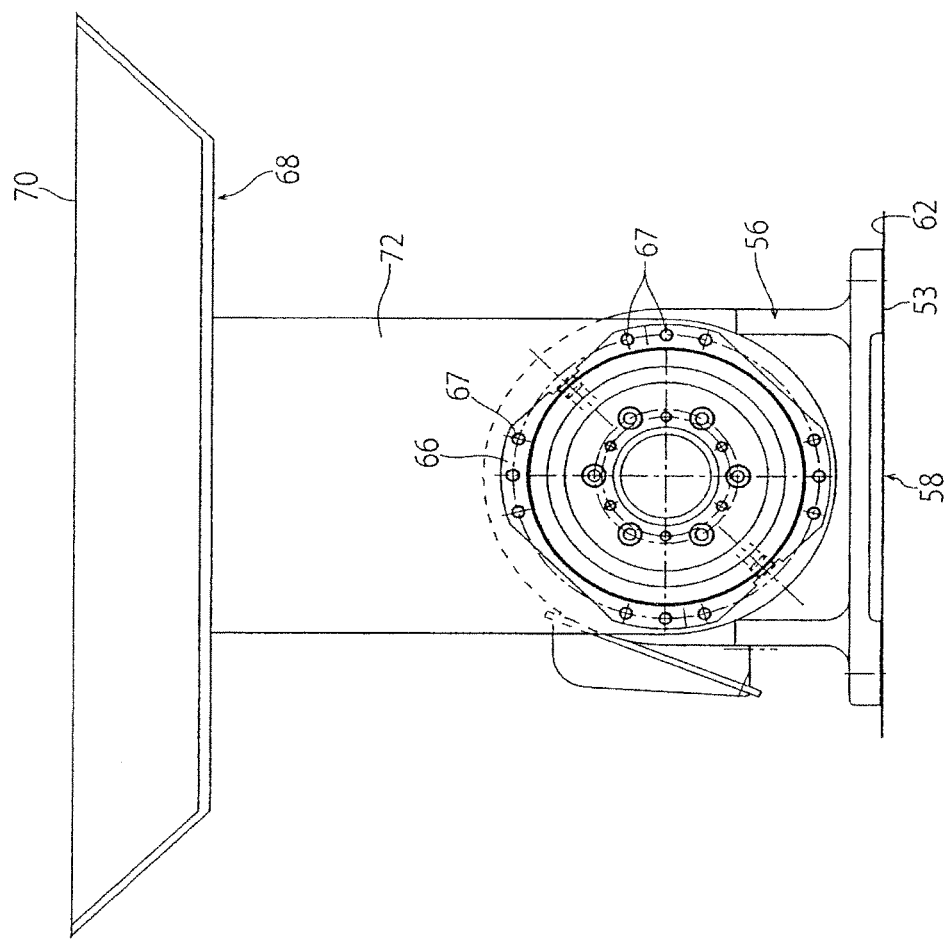
FIG. 3 is a side view of FIG. 2.

Herein, a configuration of this rotation apparatus 10 that includes the adapter 50 will be described in further detail with reference to FIGS. 1 to 3.

The motor 11 and the speed reducer 12 are connected with each other via the adapter 50.

In this embodiment, a universal three-phase induction motor is adopted as the motor 11. A motor flange 14 with a larger diameter than a motor main body 11A is disposed in a speed reducer 12 side end section of the motor 11. An adapter-fixing bolt through-hole 14A is formed in the motor flange 14.

The adapter 50 has a standing portion 56 that is positioned between the motor 11 and the speed reducer 12 and a bottom surface section 58 that is vertical to the standing portion 56, and substantially has an inverted T-shaped overall cross-sectional shape. A through-hole 54 whose inner diameter decreases in a stepwise manner from the motor 11 side is formed in the standing portion 56 of the adapter 50. The adapter 50 has a motor-fixed surface 51 that is fixed to the motor 11 and a carrier-fixed surface 52 that is fixed to the first carrier body 34 in the standing portion 56 and an externally fixed surface 53 that is vertical to the carrier-fixed surface 52 and is fixed to an installation floor 62 which is an external member in the bottom surface section 58. Hereinafter, individual descriptions will be made.

The motor-fixed surface 51 of the adapter 50 is formed on a radially outer side of the through-hole 54 and on the motor 11 side of the standing portion 56 in an axial direction. A motor taphole 51A is formed on the motor-fixed surface 51. The motor flange 14 of the motor 11 and the adapter 50 are fixed by screwing the bolt 42 into the motor tap hole 51A formed in the adapter 50 via the bolt through-hole 14A of the above-described motor flange 14.

The carrier-fixed surface 52 of the adapter 50 is formed on a speed reducer 12 side of an inner flange section 60 in an axial direction which is formed by decreasing the inner diameter of the through-hole 54 of the standing portion 56. A bolt through-hole 60A that penetrates the inner flange section 60 is formed in the inner flange section 60. The first carrier body 34 and the adapter 50 are fixed by screwing a bolt 61 into the adapter tap hole 34A formed in the first carrier body 34 via the bolt through-hole 60A of the inner flange section 60.

In the bottom surface section 58 of the adapter 50, the externally fixed surface 53 of the adapter 50 is formed on an installation floor 62 side, the installation floor 62 being an external member. An installation floor through-hole (only a center line 64 is shown) that allows penetration by a bolt (not shown) is formed in the bottom surface section 58 of the adapter 50 so as to fix the adapter 50 to the installation floor 62. The bottom surface section 58 of the adapter 50 extends in parallel with the shaft center O1 of the internal gear 22.

Also, a horizontal flange section 59 that projects in an axial direction to the speed reducer 12 side is formed in the adapter 50, and the horizontal flange section 59 is externally fitted into an end section 25 of the casing 24 of the speed reducer 12. A gap is disposed between an inner circumference of the horizontal flange section 59 and an outer circumference of the end section 25.

A flange section 66 is disposed in the casing 24 of the speed reducer 12. The flange section 66 is formed to project to a radially outer side across an outer circumference at a position opposite to the motor side away from an axial center of the casing 24 of the speed reducer 12. A tap hole 66A is formed in a penetrating manner in the flange section 66 so that a material tray 68 that is a driven member is connected thereto. The material tray 68 is fixed to the flange section 66 of the casing 24 by a plurality of bolts 67 that are screwed into the tap hole 66A. In the example that is shown, the number of the bolts 67 which are used is 12 (refer to FIG. 3).

As shown in FIG. 2, the material tray 68 is configured to have a material holder 70 where a material is placed, and a supporting plate 72 that supports the material holder 70. The supporting plate 72 has a ring-shaped flange section-fixed surface 74 that corresponds to the flange section 66 of the casing 24. In other words, the material tray 68 is connected to the flange section 66 of the casing 24 via the flange section-fixed surface 74 of the supporting plate 72 in a state where an entire outer circumference of the casing 24 of the speed reducer 12 is surrounded.

The material tray 68 that is the driven member, the speed reducer 12, and the externally fixed surface 53 of the adapter 50 are overlapped with each other when viewed from a radial direction. Herein, a simple expression of "A and B being overlapped with each other when viewed from a radial direction" means both a case where A and B are overlapped with each other with an axial area of one of A and B being totally included in an axial area of the other and a case where a part of the axial area of the one of A and B is overlapped with a part of the axial area of the other. An expression of "a total axial length of A is overlapped with B when viewed from a radial direction" means that the total axial area of A is included in the axial area of B.

In this embodiment, a total axial length L3 of the speed reducer 12 is overlapped with the material tray 68 and the externally fixed surface 53 of the adapter 50 when viewed from a radial direction. Also, the material tray 68, the motor 11, and the externally fixed surface 53 of the adapter 50 are overlapped with each other when viewed from a radial direction.

Further, in this embodiment, a total axial length L5 of the motor 11 is overlapped with the material tray 68 viewed from a radial direction. As a result, the material tray 68 is overlapped with each of a total axial length L1 of the externally fixed surface 53 of the adapter 50, the total axial length L3 of the speed reducer 12, and the total axial length L5 of the motor 11 when viewed from a radial direction. In other words, in this embodiment, a total axial length L7 of a driving system configured to have the motor 11, the adapter 50, and the speed reducer 12 is overlapped with the material tray 68 when viewed from a radial direction.

Next, an effect of this rotation apparatus 10 will be described.

When the motor shaft 16 of the motor 11 is rotated and the input shaft 18 of the speed reducer 12 is rotated, the three eccentric bodies 26 that are integrated with the input shaft 18 are rotated and the three external gears 20 oscillate via the rollers 28. As a result, a phenomenon in which an engagement position of the external gear 20 with respect to the internal gear 22 is gradually shifted occurs. Since the number of the teeth of the external gear 20 is less by one than the number of the teeth of the internal gear 22, a circumferential direction phase of the external gear 20 with respect to the internal gear 22 is shifted by one tooth every time the input shaft 18 is rotated once, and the external gear 20 is relatively rotated with respect to the internal gear 22.

This rotational component (is likely to be removed from the first and second carrier bodies 34 and 36 in many cases via the pin-shaped member 32 and the inner roller 33 but), in this embodiment, fixes the first and second carrier bodies 34 and 36 to the installation floor 62 via the externally fixed surface 53 of the adapter 50, and removes the relative rotation from the casing 24. The relative rotation is removed in a certain limited range. In this embodiment, the rotation is set to be made in a range of ±(45 degrees to 90 degrees) by a program. In the rotation apparatus 10, the rotation can be made within a maximum range of ±90 degrees (that is, within 180 degrees). In certain embodiments of the present invention, the rotation does not necessarily have to be made at the same ±vertical angle but, for example, the angle may be +20 degrees and −160 degrees horizontally depending on application. In short, the rotation may be made within a total of 180 degrees.

Herein, in the rotation apparatus 10 according to this embodiment, the motor 11 and the speed reducer 12 are connected with each other via the adapter 50. The adapter 50 is fixed to the motor flange 14 of the motor 11 via the motor-fixed surface 51, is fixed to the first carrier body 34 of the speed reducer 12 via the carrier-fixed surface 52, and is fixed to the installation floor 62 that is the external member via the externally fixed surface 53. In other words, the motor 11, the speed reducer 12, and the material tray 68 that is mounted on the speed reducer 12 are fixed to the installation floor 62 via the adapter 50 which is positioned between the motor 11 and the speed reducer 12.

Also, the material tray 68, the speed reducer 12, and the externally fixed surface 53 of the adapter 50 are overlapped with each other when viewed from a radial direction of the speed reducer 12. Accordingly, the total axial length L7 of the driving system that is configured to have the motor 11, the adapter 50, and the speed reducer 12 does not project at all from the material tray 68, and thus the entire rotation apparatus 10 is shortened by the total axial length L7 of the driving system. Also, since the adapter 50 is positioned between the motor 11 and the speed reducer 12, the entire rotation apparatus 10 can be fixed to the installation floor 62 in a very balanced manner.

In particular, in this embodiment, the total axial length L3 of the speed reducer 12 is overlapped with the material tray 68 and the externally fixed surface 53 of the adapter 50 when viewed from a radial direction. Accordingly, not only the material tray 68 can be configured to be fixed to the casing 24 of the speed reducer 12 but also the material tray 68 can be rotated in a stable manner.

Also, in this embodiment, the material tray 68, the motor 11, and the externally fixed surface 53 of the adapter 50 are also overlapped with each other when viewed from a radial direction. Accordingly, an axial length Lo of the entire rotation apparatus 10 including the motor 11 can be shortened in particular, and high support balance can be achieved.

Also, the horizontal flange section 59 that projects in an axial direction to the speed reducer 12 is formed in the adapter 50, and the horizontal flange section 59 is externally fitted into the end section 25 of the casing 24 of the speed reducer 12. Accordingly, powder and granular materials falling from the material tray 68 and powder and granular materials floating in the air come into contact with the oil seal 44 that are arranged in the end section 25 of the casing 24 of the speed reducer 12. As such, early deterioration of the oil seal 44 can be suppressed.

Also, in this embodiment, the material tray 68 is connected to the casing 24 while surrounding the entire outer circumference of the casing 24. In other words, the material tray 68 is connected to the flange section 66 of the casing 24 via the flange section-fixed surface 74 of the supporting plate 72 in a state where the entire outer circumference of the casing 24 of the speed reducer 12 is surrounded. Accordingly, the supporting plate 72 of the material tray 68 is fixed to the flange section 66 over a very large circular area corresponding to the outer circumference of the flange section 66, and very high connection rigidity can be maintained and the rotation can be made with high rigidity even in the material tray 68 with large dimensions.

In certain embodiments of the present invention, the entire outer circumference of the casing does not necessarily have be surrounded during the connection between the driven member and the casing but, for example, a configuration in which a part (for example, half) of a circumferential direction of a flange is connected may also be possible. Also, the connection does not necessarily have to be made via the flange section projecting from the casing but, for example, a configuration in which a step is formed on the outer circumference of the casing and the step is used to connect with the driven member may also be possible. Further, a configuration in which a plurality of ear sections (connection sections) are formed and the driven member is connected via the plurality of ear sections may also be possible.

Also, in certain embodiments of the present invention, some of the dimensional relationships of the above-described embodiment may not be satisfied. An effect corresponding to the basic effect of certain embodiments of the present invention, that is, "shortening of the axial length of the rotation apparatus," can be achieved insofar as the driven member, the speed reducer, and the externally fixed surface are overlapped with each other when viewed from a radial direction of the speed reducer.

Also, in this embodiment, the eccentric oscillation type speed reducer (center crank type) in which only one eccentric body shaft (input shaft 18 in the above-described example) having the eccentric body is present at a radial center of the internal gear is shown. However, as a reduction mechanism of this type of speed reducer, a reduction mechanism (distribution type) in which a plurality of eccentric body shafts are provided at a position offset from a shaft center of an internal gear and an external gear is oscillated by synchronously rotating eccentric bodies provided in the plurality of eccentric body shafts. Certain embodiments of the present invention can be applied in exactly the same manner even to a rotation apparatus that adopts a speed reducer which has the distribution type reduction mechanism. Further, certain embodiments of the present invention can be applied in the same manner even to a rotation apparatus adopting a simple planetary gear speed reducer or the like insofar as the speed reducer has a casing, an internal gear that is integrated with the casing, a planetary gear that is internally engaged with the internal gear, and a carrier body that is arranged in an axial side portion of the planetary gear.

In the above-described embodiment, the carrier-fixed surface 52 and the externally fixed surface 53 are vertical to each other, but certain embodiments of the present invention are not limited thereto and both thereof may not be parallel with each other. In other words, an extension surface of the carrier-fixed surface 52 and an extension surface of the externally fixed surface 53 may cross each other.

It should be understood that the invention is not limited to the above-described embodiment, but may be modified into various forms on the basis of the spirit of the invention. Additionally, the modifications are included in the scope of the invention.

What is claimed is:

1. A rotation apparatus including a motor and a speed reducer,
wherein the speed reducer includes a casing, an internal gear that is integrated with the casing, a planetary gear that is internally engaged with the internal gear, and a carrier body that is supported by the casing via a bearing,
wherein the motor and the speed reducer are connected with each other via an adapter,
wherein the adapter includes a motor-fixed surface that is fixed to the motor, a carrier-fixed surface that is fixed to the carrier body, and an externally fixed surface that is not parallel with the carrier-fixed surface and is fixed to an external member,
wherein a driven member is connected to the casing,
wherein the casing and the driven member rotate integrally with each other,
wherein the driven member, the speed reducer, and the externally fixed surface are overlapped with each other when viewed from a radial direction of the speed reducer, and
wherein the driven member is rotated within a range of 180 degrees.

2. The rotation apparatus including a motor and a speed reducer according to claim 1,
wherein a total axial length of the speed reducer is overlapped with the driven member and the externally fixed surface when viewed from a radial direction.

3. The rotation apparatus including a motor and a speed reducer according to claim 1,
wherein the driven member, the motor, and the externally fixed surface are overlapped with each other when viewed from a radial direction.

4. The rotation apparatus including a motor and a speed reducer according to claim 1,
wherein a part of the adapter is externally fitted into an end section of the casing of the speed reducer.

5. The rotation apparatus including a motor and a speed reducer according to claim 1,
wherein the driven member is connected to the casing while surrounding an entire outer circumference of the casing.

6. The rotation apparatus including a motor and a speed reducer according to claim 1, the rotation apparatus further comprising,
a second carrier body that is connected with the carrier body,
wherein the planetary gear is arranged between the carrier body and the second carrier body.

* * * * *